2,963,326
Patented Dec. 6, 1960

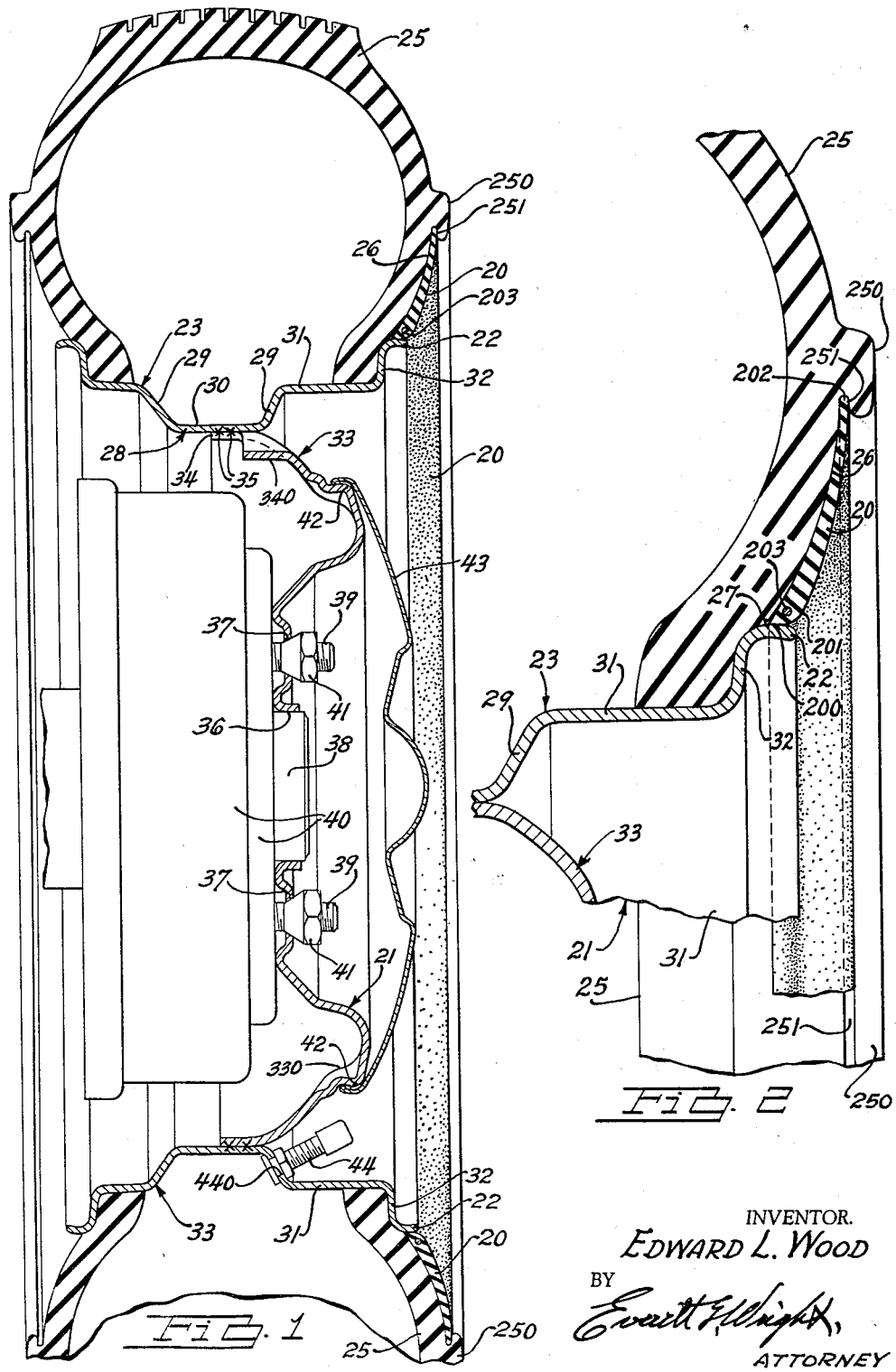
Dec. 6, 1960 — E. L. WOOD — 2,963,326
TIRE TRIM
Filed June 11, 1958 — 2 Sheets-Sheet 1
INVENTOR.
EDWARD L. WOOD
BY
ATTORNEY

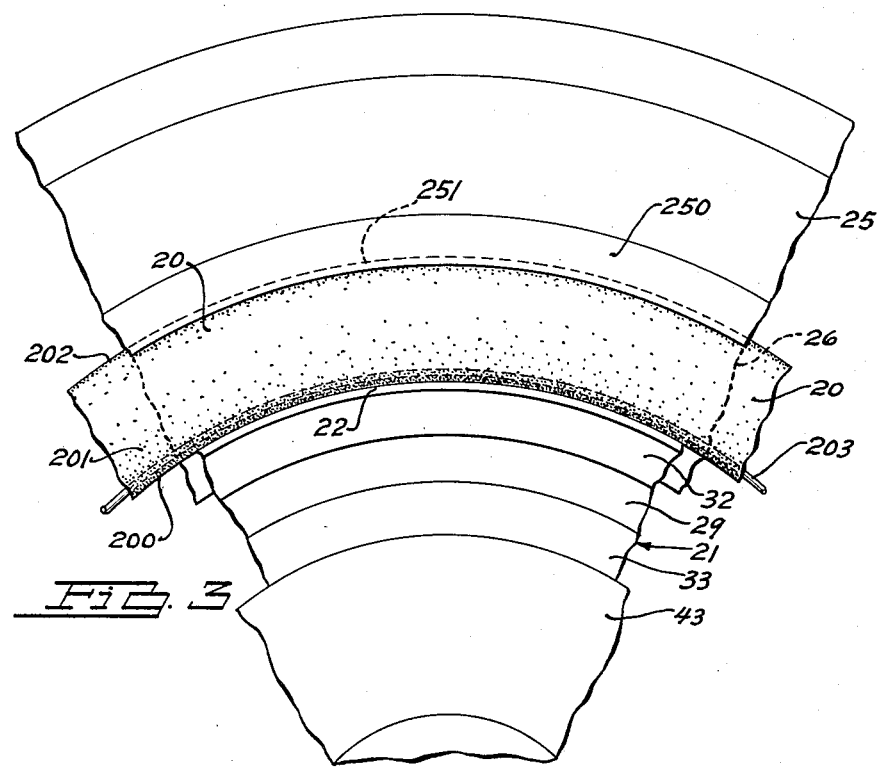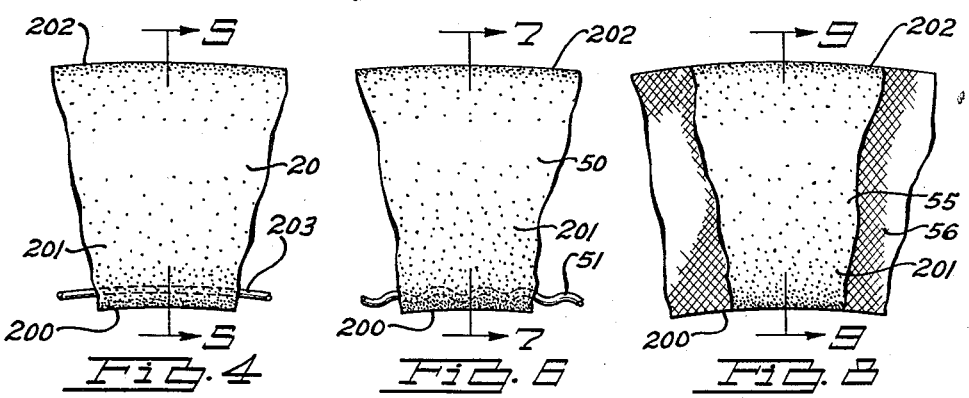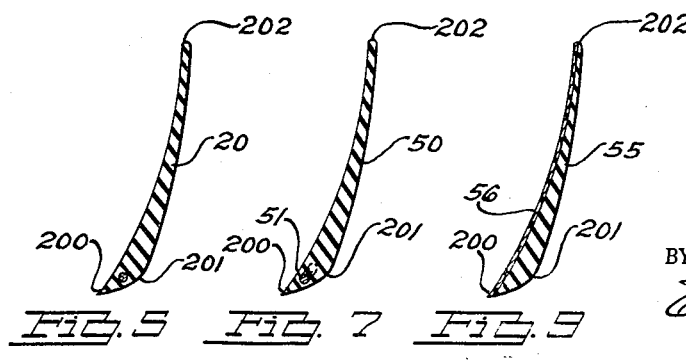

United States Patent Office

2,963,326

TIRE TRIM

Edward L. Wood, 4684 Audubon, Detroit 24, Mich., assignor of one-half to Charles B. Aske, Jr., Birmingham, Mich.

Filed June 11, 1958, Ser. No. 741,339

3 Claims. (Cl. 301—37)

This invention relates to tire trim of the type employed to ornamentally trim the side walls of black automobile tires to provide a white or other colored side wall tire effect.

The primary object of the invention is to provide a simplified and inexpensive means for converting black side wall tires to white or other colored side wall tires.

Another object of the invention is to provide means for ornamentally trimming the side walls of vehicular tires which is easy to install and which does not interfere with the mounting of conventional tubeless tires on wheel rims.

Other objects of the invention will become apparent by reference to the following detailed description taken in connection with the following drawings, in which:

Fig. 1 is a vertical sectional view through a vehicle wheel and tire having mounted thereon a tire trim embodying the invention.

Fig. 2 is an enlarged fragmentary sectional view showing in more detail the mounting of the said tire trim on the said wheel and tire.

Fig. 3 is a fragmentary elevational view of the construction shown in Fig. 2.

Figs. 4 and 5 are elevational and sectional views respectively of the embodiment of the invention disclosed in Figs. 1–3 inclusive.

Figs. 6 and 7 are elevational and sectional views respectively of an alternate embodiment of the invention.

Figs. 8 and 9 are elevational and sectional views respectively of still another embodiment of the invention.

Referring now to the drawings wherein like numerals refer to like and corresponding parts throughout the several views, the particular illustrative embodiment of the invention disclosed in Figs. 1–5 inclusive comprises a tire trim ring 20 of molded rubber, synthetic rubber or other suitable relatively stiff yet resilient material held firmly between the lip 22 of the rim 23 of the vehicle wheel 21 and the scuff bead 250 of the tire 25 mounted thereon, the said tire trim ring 20 lying over and against the side wall 26 of the said tire 25 radially and axially inwardly of the annular scuff bead 250 thereof, all as hereinafter described in detail.

The said vehicle wheel 21 has a drop center rim 23 composed of a central channel or drop center 28 having side walls 29 and a base 30. An annular tire bead seat 31 extends laterally outwardly from each side of the said walls 29 of the drop center 28. Each said tire bead seat 31 terminates in a tire bead seat flange 32 extending upwardly therefrom which is curved at its upper portion to form an axially disposed outer lip 22. The said tire bead seat flange 32 is ofttimes referred to as the wheel flange and the said lip 22 is ofttimes referred to as the lip of the wheel rim. Within the drop center rim 23 is a wheel spider 33 having an axially disposed flange 34 which is secured to the central channel 28 of the drop center rim 23 by such means as welding at 35. The said wheel spider 33 is provided with a central hub aperture 36 with securing stud holes 37 spaced therearound to accommodate respectively the wheel hub 38 and wheel securing studs 39 extending from the brake drum 40 to which the wheel 21 is secured by means of the usual wheel securing nuts 41.

The flange 34 of the spider 33 is generally scalloped out and formed at 340 at intervals around the periphery thereof to provide added structural strength to the vehicle wheel 21. The spider 33 is generally formed with an annular axially outwardly extending collar 330 which is preferably provided with a plurality of hub cap retainer nubs 42 over which a conventional hub cap 43 is sprung for securement onto the vehicle wheel 21. The particular tire 25 illustrated in the drawings is a modified modern tubeless tire having a scuff bead 250, and, if a tubeless tire 25 is used on the vehicle wheel 21, a valve stem 44 is mounted in sealed relationship through the valve stem aperture 440 provided in the outer wall 29 of the drop center rim channel 28 of the rim 23 of the said wheel 21.

The tire trim ring 20 is annular in shape and arcuate in cross section, and is preferably somewhat thicker at 201 adjacent its inner periphery 200 than at its outer periphery 202. When installed on a wheel and tire assembly 21—25, the said tire trim ring 20 lies flat against the side wall 26 of the tire 25 radially inwardly of the scuff bead 250 thereof. The inner periphery 200 of the said tire ring 20 is preferably formed to a relatively thin edge adapted to be positioned in the generally V-shaped groove 27 at the juncture of the lip 22 of the rim 23 of the wheel 21 and the side wall 26 of the tire 25 as best shown in Figs. 1 and 2. The annular scuff bead 250 of the said tire 25 is provided with a circumferentially disposed radially inwardly facing groove 251 therein adjacent the side wall 26 of said tire which receives the relatively thin outer periphery 202 of the tire trim ring 20. Thusly, the said tire trim ring 20 lies along the side wall 26 of the tire 25 between the V-shaped groove 27 at the juncture of the said tire wall 26 and the lip 22 of the rim 23 of the vehicle wheel 21 and the scuff bead 250 of the tire 25, the outer periphery 202 of the said tire trim ring 20 being disposed within the circumferential radially inwardly facing groove 251 in the scuff bead 250 of the said tire 25.

In the embodiment of the invention disclosed in Figs. 1–5 inclusive, it is preferable that the thicker portion 201 adjacent the inner periphery 200 of the tire trim ring 20 be reinforced with a continuous resilient wire loop 203 to prevent the said tire trim ring 20 from expanding radially and circumferentially due to centrifugal force applied thereto when a vehicle equipped with white or colored wall tire trim means 20 embodying the invention is driven at high speeds. When the tire 25 flexes axially and radially, the tire trim means 20 flexes therewith and remains substantially in contact with the side wall 26 of the tire 25 during flexing, the said tire trim means 20 having sufficient resiliency to return to its normal nonflexed attitude with and adjacent the tire 25 when it returns to its normal non-flexed attitude.

The embodiment of the invention disclosed in Figs. 6 and 7 is like and similar to the embodiment of the invention shown in Figs. 1–5 inclusive except that the tire trim ring 50 of Figs. 6 and 7 employs a wavy reinforcing wire loop 51 which is substituted for the straight reinforcing wire loop 203 of the trim ring 20 shown in Figs. 4 and 5. The use of a wavy reinforcing wire loop 51 will permit slight radial and circumferential resiliency of the tire trim ring 50.

The embodiment of the invention disclosed in Figs. 8 and 9 is like and similar to the embodiments of the invention shown in Figs. 1–7 inclusive except that the tire trim ring 55 of Figs. 8 and 9 does not employ any metal reinforcement but does employ a fabric reinforcement 56 which may be either molded into the back of the tire trim ring 50 or otherwise adhered firmly thereto.

Obviously, by using a relatively expensive molded rubber or the like which would maintain its shape and dimension under the centrifugal force applied thereto, and which would not lose its resiliency during long exposure to the elements, the reinforcing means of the several embodiments of the invention may be omitted. Also, if desired, both the fabric reinforcement 56 and one of the metal reinforcements 203 or 51 may be combined in a single tire trim ring construction.

The circumferential radially inwardly facing groove 251 of the scuff bead 250 is preferably molded in the tire 25 during its manufacture; however, it may be cut or ground in the tire after manufacture thereof.

Although but a single embodiment of the invention and several alternate constructions have been disclosed and described herein, it is obvious that many changes may be made in the size, shape, arrangement and detail of the various elements of the invention, all without departing from the spirit and scope thereof as defined by the appended claims.

I claim:

1. In combination with a vehicle wheel having a tire mounting rim, a black wall tire mounted on said rim, said rim including a tire bead seat, a tire bead seat flange extending radially outwardly from said tire bead seat and having an axially disposed outer lip, said tire including a mounting bead seating on said tire bead seat and juxtaposed to said tire bead flange leaving a V-shaped groove at the juncture of the tire wall and the lip of the wheel rim, and said tire including an annular scuff bead on the outer wall thereof spaced from said wheel rim lip having a radially inwardly disposed groove therein adjacent the said outer wall thereof, a resilient annular tire trim ring of a color contrasting with said black wall tire arcuately shaped to conform to the outer wall of the tire between the base of the scuff bead groove and the said V-shaped groove at the juncture of the tire wall and the lip of the wheel rim, the outer and inner peripheries of said annular tire trim ring being formed to conform with said tire scuff bead groove and said V-shaped groove respectively, and means reinforcing said resilient annular tire trim ring against circumferential expansion yet permitting it to flex with the normal flexing of the tire when in use.

2. The combination set forth in claim 1 wherein the reinforcing means of the resilient annular tire trim ring consists of a fabric backing means.

3. The combination set forth in claim 1 wherein the reinforcing means of the annular resilient tire trim ring consists of a continuous annular wire loop embedded therein adjacent the inner periphery thereof.

References Cited in the file of this patent

UNITED STATES PATENTS

| | | |
|---|---|---|
| 2,440,804 | Lyon | May 4, 1948 |
| 2,691,550 | Nickerson | Oct. 12, 1954 |
| 2,802,512 | Rouse | Aug. 13, 1957 |
| 2,822,219 | Billingsley | Feb. 4, 1958 |